Aug. 19, 1941.   B. C. HALE   2,252,924
VALVE
Filed April 24, 1939

INVENTOR.
B. C. HALE
BY
ATTORNEYS.

Patented Aug. 19, 1941

2,252,924

UNITED STATES PATENT OFFICE 2,252,924

VALVE

Byford C. Hale, Tulsa, Okla.

Application April 24, 1939, Serial No. 269,600

2 Claims. (Cl. 251—121)

This invention relates to new and useful improvements in valves, and particularly to ball-and-seat type valves for oil well pumps.

In conventional type deep well pumps using the ordinary ball-and-seat valve, the seat members are subjected to a continual battering or pounding by the dropping of the usual steel ball when such valves are closed, and particularly so when the ball is not in perfect alignment with the seat when dropping therein. As a result of such battering, the ball will frequently distort or "peen" the usual ground surface, resulting in leakage through the valve and necessitating withdrawal of the pumping equipment from the well and repair or replacement of the seat member. The effective life of such seat members varies greatly depending upon well conditions, including the fluid pressure in the well, the rate of stroke operation of the pump, etc. In many cases under severe conditions, a seat may retain its sealing efficiency for as little as three or four days. In any case, removal of the well rods and pumping equipment for replacement or repair of the defective valve is relatively expensive operation which is to be avoided as much as possible.

It is a principal object of this invention to provide an improved form of ball-and-seat valve construction which greatly obviates the aforedescribed battering and "peening" action of the ball on the seat member of such valves and to thereby greatly prolong the normal life of such valves under all conditions.

The improvement contemplated by this invention includes the provision of a separable and replaceable guide member, annularly shaped, which is ordinarily spaced vertically a short distance above the seating surface of the conventional valve seat and is provided with a tapering guide seat for guiding the ball into relatively true alignment with the seating surface of the valve seat. The spacing of the guide member above the valve seat provides an annular recess which is adapted to retain a small quantity of the fluid being pumped and so to provide a hydraulic cushion to cushion the shock of the dropping of the ball into the valve seat. The radius of the tapering guide seat, relative to the vertical axis of the valve, is greater than that of the valve seat and also greater than the section of the ball lying in the plane of the guide seat when the ball is seated in the valve seat. That is, no part of the ball will be in contact with the guide seat when the ball is seated in the valve seat.

By means of the described arrangement, the guide member, while receiving any initial battering action of the ball due to its misalignment, will not be subjected because of the enlarged opening therein, to such direct and severe pounding as the valve seat itself normally receives from a ball which is slightly misaligned relative thereto. At the same time the ring of liquid which extends between the adjacent edges of the valve seat and the guide seat will serve as a hydraulic cushion to absorb the greater portion of the shock produced by the dropping of the ball under the pressure of the column of fluid being pumped. Further, the guide seat, even when it has become battered, will not act to hold the ball away from the valve seat because its greater radius will provide sufficient clearance space for the passage therethrough of the lower portion of the ball, despite any protuberances or projections raised in the guide seat by the battering action of the ball.

It is, therefore, an important object of this invention to provide a ball-and-valve seat construction wherein a valve seat is provided with an auxiliary guide surface spaced vertically therefrom and having a spherical radius greater than that of the valve seat and of the ball to be seated therein.

Another object is to provide a ball-and-seat valve construction comprising the combination of a ball valve, a seat member and a separable guide member for guiding and for cushioning the dropping of the ball valve into the seat member.

Still another object is to provide a ball-and-seat valve construction including a separable guide seat member spaced vertically from the valve seat and off-set laterally relative thereto.

Other and more specific objects and advantages of the present invention will be readily apparent from the following detailed description when read in conjunction with the accompanying drawing which illustrates two forms of the invention.

Figure 1:
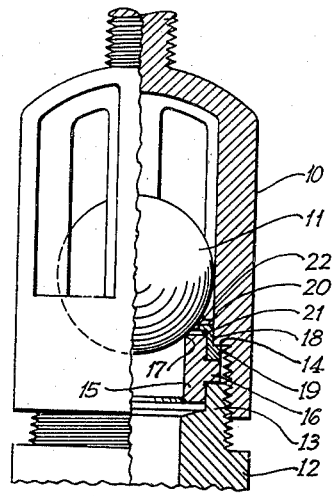
Fig. 1 is an elevation, partly in section, of one form of ball-and-seat valve construction in accordance with this invention, shown assembled in a conventional valve cage.

Referring to the drawing: the numeral 10 designates a conventional valve cage, 11 the ball and 12 the valve case, which is provided with the usual upstanding flange 13 which is externally screw threaded to receive the lower end of cage 10, which is also screw threaded internally and provided with an internal shoulder 14.

A valve seat ring 15 having the usual circumferential boss 16 is mounted in the usual manner between the cage 10 and case 12, the boss 16 being adapted to be tightly gripped between the upper end of flange 13 and the shoulder 14.

The upper end of seat ring 15 is provided at its inner edge with the usual annular ground seat 17 which is preferably concave, being in the form of a spherical section of substantially the same radius as that of ball 11. Such construction in no way departs from the conventional construction from valves of this type.

As noted above, however, conventional seats of the type described are ordinarily subjected to considerable detrimental pounding and "peening" by the dropping of the ball into the seat and in accordance with the present invention an auxiliary guide member 18 is provided to obviate such undesirable pounding by the ball.

Guide member 18 comprises a tubular sleeve adapted to surround the outer surface of the upper end of seat ring 15 above boss 16 and extends for a short distance above the upper end of the seat ring. Guide member 18 is provided at its lower end with an outwardly extending annular flange 19 which rests on the upper face of boss 16 and provides a lateral surface complementing boss 16 whereby the guide member may be firmly gripped between flange 13 and shoulder 14 along with boss 16. The upper end of guide member 18 is provided with an inwardly extending annular flange 20 which extends over the upper end of seat ring 15 and spaced slightly therefrom forming a recess 21 between the upper end of seat ring 15 and the lower face of flange 20. The internal diameter of flange 20 is greater than the largest diameter of the ground seat 17 and is provided with an upwardly and outwardly tapering guide surface 22 which may also be concave in form but not necessarily so. It is particularly important, however, for the purposes of this invention that guide surface 22 to set back or offset relative to the slope of seat 17 so that when ball 11 is properly seated in seat 17, no part of the ball will be in contact with guide surface 22. Thus, while the spherical radius of seat 17 is substantially equal to the radius of ball 11, the analogous radius of surface 22 should be greater than that of seat 17 or of ball 11. Stated in another way, seat 17 and surface 22 may be considered to be sections of regular cones of different slopes or base radii, surface 22 being a section of the cone having the larger base radius.

In operation, this described valve seat construction functions as follows: As the ball 11 drops toward seat 17 it is guided in place by guide surface 22, which, while it receives the initial shock and battering action of the ball, is less subject to damage by the ball, because of its relatively larger internal diameter, and even if "peening" of surface 22 occurs, any resulting protuberances or projections will not ordinarily distort seating surface 22 sufficiently to prevent ball 11 from seating perfectly in seat 17.

The recess 21 will retain a quantity of the fluid being pumped and by virtue of the position of flange 20 relative to the upper end of seat ring 18, an annular ring of liquid will be interposed between these members which functions admirably to hydraulically cushion the shock produced by the dropping of the ball into seat 17 and will absorb the shock of the impact to such an extent that little or no battering of the seat 17 will occur.

Figure 6:
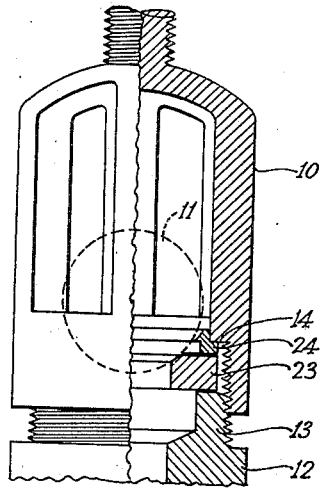
Figs. 6 and 7 are views similar to Figs. 1 and 2 but showing a modified form of valve seat in accordance with this invention.
Figure 2:
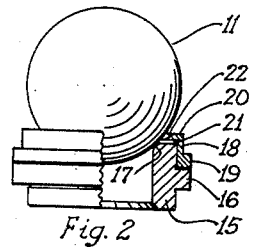
Fig. 2 is a view, partly in section, of the form of valve seat construction shown in Fig. 1.
Figure 7:
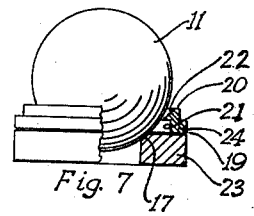
Figure 4:
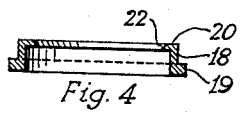
Figs. 4 and 5 are sectional details of the seat members of the valve.
Figure 5:
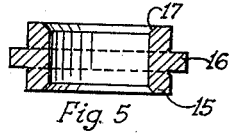
Figure 3:
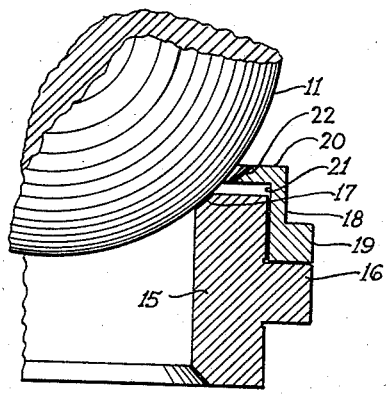
Fig. 3 is an enlarged detail showing the seat construction.

Figs. 6 and 7 illustrate another modification of the present invention, which is applicable particularly to another more or less conventional form of valve seat ring, which is the so-called "single end" valve as compared with the conventional "double end" valve illustrated in the previous modification.

In this modification the boss 16 is merely an extension of seat ring 15 and is of the same thickness throughout. This form of seat ring is designated by the numeral 23. The guide member, designated 24, is of the same general construction as guide member 18, but is shorter in length and adapted to be positioned on top of the upper end of seat ring 23 rather than to surround it, as in the case of the previously described modification. However, the modified form functions in exactly the same manner as that first described, and all the other parts of the structure are identical and are designated by the same numerals as those applied in Figs. 1 to 5, inclusive.

By the described seat construction the effective life of conventional valve seats of the class described have been greatly lengthened and their efficiency remarkably increased. For example in one extreme case where a conventional valve lasted only three days, a valve constructed in accordance with this invention lasted more than ten days. In another case, where conventional valve gave service for 30 to 60 days, the new valve worked perfectly for 180 days and was still in perfect condition, being removed only because other parts of the pumping equipment required replacement.

Another important advantage of the new invention resides in the fact that when the valve loses efficiency it is generally only necessary to replace the guide member 18, thereby greatly reducing the cost of replacement.

The new valve seat construction provides still further advantages in cases where the well fluids being pumped are corrosive to the steel alloys ordinarily used for valve seat construction. Under such conditions it has heretofore been the practice to use corrosion resisting alloys such as Monel metal or the like. Such metals, however, have the marked disadvantage of being relatively softer than steel alloys and do not, therefore, resist the battering action of the ball as well as do the harder steel alloys. Under these conditions it is found to be highly satisfactory to make seat 17 of Monel or other corrosion resisting metal and to make guide member 18 of a hard steel alloy. The latter, while subject to corrosion, will relieve the softer seat of the battering action of the ball, assisted, of course, by the hydraulic cushion provided by means of recess 21. Although corrosion of the guide member occurs, the consequent pitting or other results of corrosion will not greatly detract from the ball-guiding function of guide member until corrosion is very far advanced, and then only the guide member will require replacement instead of the entire seat, thus reducing the cost of repair of the valve.

The principal advantage arising from the use of the new valve construction herein described is that by lengthening the effective life of the valve, not only is the cost of valve parts for replacement reduced but also the far greater cost occasioned by having to pull the well rods and pumping equipment from the well each time a valve must be repaired or replaced. This latter item of cost generally will amount to from $75.00 to many times that figure, depending upon the depth of the well, every time the well is "pulled." Loss of production during the repair period is another important factor for consideration.

It will be understood that various alterations and modifications may be made in the size, form and details of the parts of the valve construction comprising the described invention. For example, guide member 18 may be threaded internally and seat ring 15 externally threaded, so that guide member 18 may be screwed down on the seat ring and held in place with or without the flange 19. All such modifications and alterations will be readily understood to be within the scope of the appended claims.

What I claim and desire to secure by Letters Patent is:

1. A valve comprising a spherical valve element, an annular valve member having an annular seating surface on the inner edge thereof to receive said spherical valve element, a removable tubular guide member surrounding said valve member and extending above the upper end of said valve member, an annular lip extending inwardly from the upper end of said guide member to overhang the upper end of said valve member and spaced vertically from said upper end of said valve member to provide a radially disposed annular cushioning chamber, said lip terminating in an upwardly and outwardly tapering guiding surface, which is off-set relative to said annular seating surface whereby said spherical valve element will be out of contact with said guiding surface when seated in said annular seating surface, and a casing for housing said valve element, said valve member and said guide member.

2. A valve comprising a spherical valve element, an annular valve member, having an annular seating surface about the upper inner edge thereof and an annular boss extending laterally from the outer surface thereof, a tubular guide member removably surrounding the outer surface of said valve member and having an outwardly extending lateral flange about the lower end thereof adapted to rest upon said boss, an annular lip extending inwardly from the upper end of said guide member to overhang the upper end of said valve member and spaced vertically from said upper end of said valve member to provide a radially disposed annular cushioning chamber, the inner edge of said lip terminating in a tapering guiding surface and being off-set relative to said seating surface on said valve member, to thereby be out of contact with said spherical valve element when the latter is seated in said seating surface on said valve member, and a casing for housing said valve element, said valve member and said guide member.

BYFORD C. HALE.